(12) United States Patent
Khan (10) Patent No.: US 9,798,870 B2
(45) Date of Patent: Oct. 24, 2017

(54) BIOMETRIC DATA APPARATUS (71) Applicant: PIPA SOLUTIONS LIMITED, London (GB)

(72) Inventor: Sher Khan, London (GB)

(73) Assignee: PIPA SOLUTIONS LIMITED, London (GB)

( * ) Notice: Subject to any disclaimer, the term of this patent is extended or adjusted under 35 U.S.C. 154(b) by 102 days.

(21) Appl. No.: 14/438,164

(22) PCT Filed: Oct. 23, 2013

(86) PCT No.: PCT/GB2013/052763
§ 371 (c)(1),
(2) Date: Apr. 23, 2015

(87) PCT Pub. No.: WO2014/064440
PCT Pub. Date: May 1, 2014

(65) Prior Publication Data
US 2015/0278497 A1    Oct. 1, 2015

(30) Foreign Application Priority Data

Oct. 23, 2012  (GB) .................................. 1219028.6

(51) Int. Cl.
| | | |
|---|---|---|
| *G06F 1/26* | (2006.01) | |
| *G06F 11/00* | (2006.01) | |
| *G08B 13/00* | (2006.01) | |
| *G08B 21/00* | (2006.01) | |
| *G08B 29/00* | (2006.01) | |
| *G06F 21/32* | (2013.01) | |
| *H04M 1/04* | (2006.01) | |

(Continued)

(52) U.S. Cl.
CPC ............ *G06F 21/32* (2013.01); *G06F 1/1632* (2013.01); *G06F 21/86* (2013.01); *H04M 1/04* (2013.01); *H04M 1/67* (2013.01); *H04M 1/72575* (2013.01)

(58) Field of Classification Search
CPC .................................................... G06F 1/1632
USPC .......................................................... 726/34
See application file for complete search history.

(56) References Cited

U.S. PATENT DOCUMENTS 5,303,291 A    4/1994  Takagi et al.
8,817,476 B2 *  8/2014  Naukkarinen ........ G06F 1/1632
                                                   361/729

(Continued)

FOREIGN PATENT DOCUMENTS

EP    1811754 A1    7/2007

OTHER PUBLICATIONS

International Search Report issued Jun. 11, 2014 in corresponding International Application No. PCT/GB2013/052763.

(Continued)

*Primary Examiner* — Taghi Arani
*Assistant Examiner* — Khalil Naghdali
(74) *Attorney, Agent, or Firm* — Morris & Kamlay LLP (57) ABSTRACT

The present disclosure provides a cover for an electronic device and a biometric data apparatus for communication with an electronic device, wherein the biometric data apparatus comprises: a body; and a biometric data input element formed on the body; wherein at least part of the body is configured such that the biometric data apparatus may be releasably coupled to the electronic device when the cover for the electronic device is fitted to the electronic device.

13 Claims, 5 Drawing Sheets

(51) Int. Cl.
*H04M 1/67* (2006.01)
*H04M 1/725* (2006.01)
*G06F 1/16* (2006.01)
*G06F 21/86* (2013.01)

(56) References Cited

U.S. PATENT DOCUMENTS

| | | |
|---|---|---|
| 2003/0104791 A1 | 6/2003 | Engstrom et al. |
| 2005/0236480 A1 | 10/2005 | Vrotsos et al. |
| 2010/0031053 A1* | 2/2010 | Shih ............... G06F 21/606 |
| | | 713/186 |
| 2011/0156865 A1 | 6/2011 | Baek et al. |
| 2014/0002240 A1* | 1/2014 | Marciniak .......... G06K 9/00885 |
| | | 340/5.83 |

OTHER PUBLICATIONS

Written Opinion of the International Searching Authority issued Jun. 11, 2014 in corresponding International Application No. PCT/GB2013/052763.

* cited by examiner

BIOMETRIC DATA APPARATUS

TECHNICAL FIELD

The present disclosure relates to a biometric data apparatus.

BACKGROUND

Security for electronic devices is an important consideration, both for general operation of the device and also for access to specific functionality of the device. For example, in order to allow access only to an authorised user, mobile telephones may require the entry of a PIN before unlocking the device. However, a PIN has only limited security and, if compromised, may be used by any person who has obtained the PIN.

Biometric data, for example a finger print scan, voice recognition, iris scan etc may be utilised to confirm a user's identity before allowing access to a device. To this end, an electronic device, such as a laptop computer, may include a biometric scanner for use by a prospective operator in order to verify that they should be allowed access to the device before the device is unlocked. However, biometric scanners can be costly components and are consequently often not fitted to electronic devices. Where they are fitted to the device, it may be as an optional extra, paid for by the consumer at additional expense. When the consumer comes to upgrade the device in the future, they will have to incur the additional expense of a new biometric scanner in their new electronic device, thus increasing the cost of ownership.

US 2011/0156865 A1 describes a wireless control system and method using multiple fingerprint recognition. The system comprises a wireless control device, with which a user directly interacts, and a controller that is in wireless communication with the wireless control device. The controller is located within a control target, for example a car, such that the user may operate the wireless control device to access or unlock functionality in the control target. The wireless control device utilises multiple fingerprint recognition to determine whether or not the user should be allowed to access the functionality of the control target and sends a control signal to the controller in order to allow or deny access to the functionality.

However, this is not as convenient as having a fingerprint scanner incorporated in the device to be controlled, since it requires the user to have the wireless control device on their person at all times. If the user forgets their wireless control device, they either will not be able to access the control target, or the control target will need to offer alternative access means, for example entry of a PIN or use of a physical key, in which case the additional security of a fingerprint scanner is made redundant.

SUMMARY

The present disclosure provides a biometric data apparatus for communication with an electronic device, wherein the biometric data apparatus comprises: a body; and a biometric data input element formed on the body; wherein at least part of the body is configured such that the biometric data apparatus may be releasably coupled to the electronic device when a cover for the electronic device is fitted to the electronic device.

The biometric data apparatus is configured such that it can be releasably coupled to an electronic device, for example a mobile electronic device such as a smartphone or tablet, using a cover for the electronic device. The biometric device may be securely held by at least a part of the cover such that when the cover is fitted to the electronic device, the biometric data apparatus is coupled to the electronic device. As such, the biometric data device may be held securely with the electronic device such that a user may utilise the biometric data apparatus to exercise biometric security over at least one function of the electronic device (for example, for unlocking the electronic device) without having to remember to carry the biometric data device with them whenever they take their electronic device anywhere. Furthermore, the biometric security may be conveniently added to any existing electronic devices that the user may possess, thus allowing the user to realise improved biometric security without having to buy a new electronic device. Coupling of the biometric data apparatus to the electronic device may involve direct contact between at least part of the biometric data apparatus and at least part of the electronic device, or there may be one or more other elements physically separating them, for example the cover. Furthermore, there may be direct contact between at least part of the biometric data apparatus and at least part of the cover, or there may be one or more other elements physically separating them.

The biometric device may be decoupled from the electronic device. The biometric device may then be attached to a new electronic device, which may be a completely different size and shape to the previous electronic device, using a new cover with a size and shape that is designed for the new electronic device. Therefore, the user need own only a single biometric data device which may be ported across to and used with any number of electronic devices. For example, when the user purchases a new electronic device, they do not need to purchase a new biometric data device for that new electronic device. Thus, the cost of ownership decreases and the user does not need to go through the process of setting up a new biometric data device for every new electronic device with which they wish to exercise biometric security.

The biometric data apparatus may be configured to engage releasably with the cover in a number of different ways. For example, a pocket may be formed on the cover such that the biometric data apparatus may be inserted into the pocket in order to releasably engage the biometric data apparatus 100 with the cover 420.

Alternatively, for example, protrusions may be formed on the surface of the cover, between which the biometric data apparatus may be reversibly held (for example by sliding the biometric data apparatus between the protrusions) in order to releasably engage the biometric data apparatus with the cover.

Alternatively, for example, the cover may comprise an opening into which the biometric data apparatus 100 may be placed, wherein at least part of the outer edges of the opening and at least part of the biometric data apparatus may form a reversible mechanical engagement (for example, a snap fit) in order to releasably engage the biometric data apparatus with the cover.

Alternatively, for example, a reversible mechanical connection means may be formed on the biometric data apparatus and corresponding reversible mechanical connection means formed on the cover (for example, Velcro, poppers etc) such that the biometric data apparatus may releasably engage the cover.

Alternatively, it may be held or sandwiched between the cover and the electronic device and the cover when the cover is fitted to the electronic device.

In a first particular aspect of the present disclosure, the biometric data apparatus may comprise: a first surface; and a second surface opposing the first surface, wherein at least part of the first surface is suitable for engagement with a surface of the electronic device and at least part of the second surface is suitable for engagement with a surface of the cover for the electronic device such that the biometric data apparatus may be held between the surface of the electronic device and the surface of the cover when the cover is fitted to the electronic device.

In this particular aspect, the biometric device may thus be securely held or sandwiched between the electronic device and the cover when the cover is fitted to the electronic device. The cover may be removed from the electronic device to decouple the biometric data apparatus from the electronic device. In alternative to this particular aspect, at least part of the first surface may be suitable for engagement with one or more elements that are located between the surface of the electronic device and the first surface of the biometric data apparatus and/or the at least part of the second surface may be suitable for engagement with one or more elements that are located between the surface of the cover and the second surface of the biometric data apparatus. In this way, the biometric data apparatus may still be sandwiched between the surface of the electronic device and the surface of the cover and, therefore, releasably coupled to the cover and the electronic device without any direct contact between the biometric data apparatus and the electronic device and/or without any direct contact between the biometric data apparatus and the cover.

The biometric data input element of the biometric data apparatus may be configured to correspond with a first opening (a biometric input opening) in the cover such that when the biometric data apparatus is held between the surface of the electronic device and the surface of the cover when the cover is fitted to the electronic device, the location of the biometric data input element corresponds to the first opening in the cover. The biometric data input element may thus be accessible to the user through the first opening in the cover.

The biometric data apparatus may further comprise: a battery; and a battery charging connector and/or a data connector, wherein the battery charging connector and/or data connector is configured to correspond with a second openings (a battery charging and/or data opening) in the cover such that when the biometric data apparatus is held between the surface of the electronic device and the surface of the cover when the cover is fitted to the electronic device, the location of the battery charging connector and/or data connector corresponds to the second opening in the cover. The battery charging connector and/or data connector may thus be accessible to the user through the second opening in the cover.

The biometric data apparatus may preferably comprise a protrusion on the second surface of the biometric data apparatus, wherein the protrusion is configured to correspond with a receiving element in the cover such that when the biometric data apparatus is held between the surface of the electronic device and the surface of the cover when the cover is fitted to the electronic device, the protrusion at least partially enters the receiving element such that the biometric data apparatus is held in a fixed position relative to the cover. Thus, when the biometric data apparatus is sandwiched between the electronic device and the cover, the at least partial entry of the protrusion into the receiving element may hold the biometric data apparatus in a fixed position relative to the cover. Since the cover will be fixed to the electronic device, the biometric data apparatus will also be held in a fixed position relative to the electronic device.

The protrusion may be formed in the vicinity of the biometric input element and be configured to correspond with the first opening in the cover. For example, the protrusion may be formed to surround the perimeter of the biometric data input element and the size and shape of the first opening be configured such that at least part of the perimeter of the protrusion engages with the perimeter of the first opening so as to prevent relative movement of the biometric data apparatus and the cover.

In a further aspect, there is provided a biometric data apparatus for communication with an electronic device, wherein the biometric data apparatus comprises a body and a biometric data input element formed on the body wherein at least part of the body is configured such that the biometric data apparatus may be releasably coupled to the electronic device when the cover is fitted to the electronic device, but not to be releasably coupled to the electronic device by being held between the electronic device and the cover when the cover is fitted to the electronic device. It may instead be configured to be releasably coupled to the electronic device by other means. It may not have a first surface and a second surface opposing the first surface, wherein the first surface is suitable for engagement with a surface of the electronic device and the second surface is suitable for engagement with a surface of the cover for the electronic device such that the biometric data apparatus may be held between the surface of the electronic device and the surface of the cover when the cover is fitted to the electronic device. In the further aspect, the biometric data apparatus may be configured to be releasably coupled to the electronic device by any means other than those defined above in respect of the first particular aspect defined in claims 2 to 8.

The biometric data apparatus, regardless of how it is configured to be releasably coupled to the electronic device, may further comprise a memory element configured to store at least one biometric template, wherein the biometric data apparatus is further configured to: compare a biometric data item input via the biometric data input element against the at least one stored biometric template; determine on the basis of the comparison if access to a function of the electronic device should be allowed; and if access to the function of the electronic device should be allowed, transmit data to the electronic device to enable access to the function of the electronic device.

Preferably, the biometric data apparatus, regardless of how it is configured to be releasably coupled to the electronic device, may be further configured to store an access recovery sequence, and to compare at least two biometric data items input via the biometric data input element against at least two stored biometric template; compare a sequence in which the two biometric data items were input via the biometric data input element against the access recovery sequence; and determine on the basis of the comparison if access to a function of the electronic device should be allowed. Thus, even if the user forgets their own stored sequence, they may be notified of the access recovery sequence and quickly and easily obtain access to the function of the electronic device.

Further preferably, the access recovery sequence is a temporary sequence, such that after it has been used once to gain access to a function on the electronic device, it becomes invalid. In this way it acts as a one-time-password and may not be used for long term access to a function on the electronic device, thus improving the security of the electronic device.

The biometric data apparatus, regardless of how it is configured to be releasably coupled to the electronic device, may be configured to: generate a template for a biometric data item input via the biometric data input element; and transmit the template to the electronic device, such that the electronic device may determine if access to a function of the electronic device should be allowed. As an alternative, rather than generating and transmitting a template for an input biometric data item, an image of the input biometric data item may be transmitted. In this way the electronic device may perform authentication of the user, for example using information stored on a database or software on the electronic device, or by accessing data stored elsewhere (for example in the cloud or on a remote database), or by forwarding to received biometric data item information onto a third party for authentication (for example a web-based service or such like).

Where multiple biometric data items are input to the biometric data apparatus, the sequence of inputting the biometric data apparatus may also be transmitted to the electronic device, such that the electronic device may perform authentication on the basis of the input biometric data and also the input sequence.

In a further aspect of the present disclosure there is provided a cover for an electronic device, the cover comprising: a biometric data apparatus coupling element, wherein at least part of the biometric data apparatus coupling element is configured to releasably couple the biometric data apparatus to the electronic device when the cover is fitted to the electronic device. The biometric data apparatus coupling element enables to the biometric data apparatus to be releasably coupled to the electronic device, as explained in respect of the biometric data apparatus configurations above.

The biometric data apparatus coupling element may be configured to releasably engage the biometric data apparatus by any means. For example, it may have corresponding elements to the releasable engagement mechanisms described in respect of the biometric data apparatus above.

In a first particular aspect, the cover may comprise a surface configured such that the biometric data apparatus may be held, or sandwiched, between the surface of the cover and the electronic device when the cover is fitted to the electronic device, thus releasably coupling the biometric data apparatus to the electronic device.

The surface of the cover may comprise a first opening (a biometric input opening) in the surface, wherein the biometric input opening is configured such that when the cover is fitted to the electronic device, the first opening corresponds with a biometric data input element on a biometric data apparatus that is held between the electronic device and the cover.

The cover may further comprise a second opening (a battery charging and/data connection opening) in the surface of the cover, wherein the second opening is configured such that when the cover is fitted to the electronic device, the second opening corresponds with a battery charging connection and/or data connection on the biometric data apparatus that is held between the electronic device and the cover. Thus the battery charging connection and/or data connection on the biometric data apparatus is accessible even when the biometric data apparatus is held within the assembled electronic device and cover arrangement.

The cover preferably further comprises a receiving element on the surface wherein the receiving element is configured to correspond with a protrusion on the biometric data apparatus such that when the biometric data apparatus is held between the electronic device and the surface of the cover when the cover is fitted to the electronic device, the protrusion at least partially enters the receiving element such that the biometric data apparatus is held in a fixed position relative to the cover. The receiving element may be the first input opening and/or the second input opening. At least one further receiving element may also be provided on the cover to correspond with at least one further protrusion on the biometric data apparatus and/or one or more protrusions may be provided on the cover to correspond with one or more receiving elements on the biometric data apparatus. Thus, the biometric data apparatus may be held in a fixed position relative to the cover and the electronic device.

In a further aspect, there is provided a cover for an electronic device, the cover comprising: a biometric data apparatus coupling element, wherein at least part of the biometric data apparatus coupling element is configured releasably to couple the biometric data apparatus to the electronic device when the cover is fitted to the electronic device, but not to releasably couple the biometric data apparatus to the electronic device by virtue of a surface on the cover configured such that the biometric data apparatus may be held, or sandwiched, between the surface of the cover and the electronic device when the cover is fitted to the electronic device. It may instead be configured to releasably couple the biometric data apparatus to the electronic device by any other suitable means. In a further aspect, the cover may be configured to releasably couple the biometric data apparatus to the electronic device by any means other than those described in the first particular aspect above. In a further aspect, the cover may be configured to releasably couple the biometric data apparatus to the electronic device by any means other than those defined in the present claims.

In a further aspect of the present disclosure, there is provided a kit of parts comprising: the biometric data apparatus and the cover.

In a further aspect of the present disclosure there is provided a method for using a biometric data apparatus to unlock a mobile electronic device, the method comprising the steps of: receiving from a user at least one biometric data item via a biometric data input element on the biometric data apparatus; and transmitting data relating to the at least one biometric data item to the mobile electronic device, wherein the transmitted data is suitable for use by the mobile electronic device to unlock the mobile electronic device if the user is authorised or keep the mobile electronic device locked if the user is unauthorised. The biometric data apparatus itself may perform biometric identification of the user and transmit data to indicate that the user is authorised for unlocking the mobile electronic device or is unauthorised for unlocking the mobile electronic device. Alternatively, the transmitted data may be an image(s) of the input biometric data and/or an electronic template(s) of the input biometric data so that the electronic device may perform biometric identification of the user.

In a further aspect of the present disclosure there is provided a method for controlling access to a function of an electronic device, the method comprising the steps of: receiving from a user at least two biometric data items via a biometric data input element; generating a template of each of the at least two biometric data items; comparing the at least two templates against at least two biometric data item templates stored on the biometric data apparatus; comparing an input sequence of the at least two biometric data items against an access recovery sequence; and if the at least two templates each match a stored biometric data item template and the input sequence matches the access recovery sequence, enabling access to the function of the electronic device. This method may be performed on a biometric data apparatus to control access to an electronic device, or may be performed on an electronic device with an integrated biometric input element. The step of comparing the at least two templates against at least two stored biometric data items may be carried out after each biometric data item is input, or after all of the biometric data items are input. If this is performed after all biometric data items are input, if authorisation fails and access is denied, the user may be prevented from knowing which, if any of the input biometric data items were incorrect, and/or if it were the input sequence that was incorrect. This may help to prevent fraudulent users from overcoming the security of the method.

In a further aspect of the present disclosure there is provided a method for using a biometric data apparatus to control access to a function of an electronic device, the method comprising the steps of: receiving from a user at least two biometric data items via a biometric data input element on the biometric data apparatus; generating a template of each of the at least two biometric data items; comparing the at least two templates against at least two biometric data item templates stored on the biometric data apparatus; comparing an input sequence of the at least two biometric data items against an access recovery sequence; and if the at least two templates each match a stored biometric data item template and the input sequence matches the access recovery sequence, transmitting data to the electronic device in order to enable access to the function of the electronic device. As an alternative, the biometric data apparatus may transmit images and/or electronic templates of the input biometric data and the sequence of the input biometric data for the electronic device to perform (or instruct the performance of) biometric identification of the user and compare the sequence to an access recovery sequence. In this way, quick and straightforward access to the electronic device may be realised even when the user has forgotten their sequence.

Preferably, the access recovery sequence is a temporary access recovery sequence that is made invalid after the input sequence of the at least two biometric data items matches the temporary access recovery sequence. In this way it is a one-time-password that may be used only once to access the function of the electronic device.

The present disclosure also provided a method for using a biometric data apparatus to control access to a function of an electronic device, the method comprising the steps of: receiving from a user at least two biometric data items via a biometric data input element on the biometric data apparatus; and transmitting data relating to the at least two biometric data items input to the electronic device and the sequence in which the at least two biometric data items were input to the electronic device, so that the electronic device may verify the identity of the user based on the at least two biometric data items input to the electronic device and the sequence in which the at least two biometric data items were input to the electronic device. The transmitted data may include the sequence and images of the at least two biometric data items and/or electronic templates of the at least two biometric data items. The electronic device itself may perform the verification, or it may instruct the verification to take place elsewhere (for example, by a web service).

The present disclosure also provides a method for storing a sequence of biometric data items in a device, the method comprising the steps of: indicating to a user the number of biometric data items that must be included in the sequence, wherein the indicated number of biometric data items is randomly determined; and inputting to the device a sequence of biometric data items, wherein the number of biometric data items in the sequence is equal to the indicated number of biometric data items. The device may, for example, be a biometric data apparatus, or it may be an electronic device that is in communication with a biometric data apparatus, or it may be an electronic device with integrated biometric data input element. The number of biometric data items may be randomly determined and indicated to the user by the biometric data apparatus, or by some other electronic device in communication with the biometric data apparatus. In this way, different users may be required to enter sequences of different lengths, wherein those lengths may be different to the length that they would normally use. Thus, the subsequent security realised by the biometric data apparatus may be improved because unauthorised users would have to enter the correct biometric data in the correct sequence order and length. Furthermore, because the user may not be able to use a sequence length that they would normally choose, they are more likely to have to use a different sequence to that which they would normally use, thus even further improving security.

In a further aspect of the present disclosure there is provided a cover for an electronic device, wherein the cover comprises: a wireless communications module configured for wireless communication with the electronic device; and a biometric data input element in communication with the wireless communications module, such that the wireless communications module may transmit data relating to biometric data input to the biometric data input element to the electronic device in order to control access to a function of the electronic device. Thus, a user may add biometric security functionality to an existing electronic device without having to purchase a new electronic device. Because the cover is configured for wireless communication with the electronic device, the form factor of the cover may be similar or the same as a standard electronic device cover.

BRIEF DESCRIPTION OF THE DRAWINGS

A biometric data apparatus and method of using the biometric data apparatus for identity verification is described, by way of example only, with reference to the following drawings in which.

DETAILED DESCRIPTION

Figure 1:
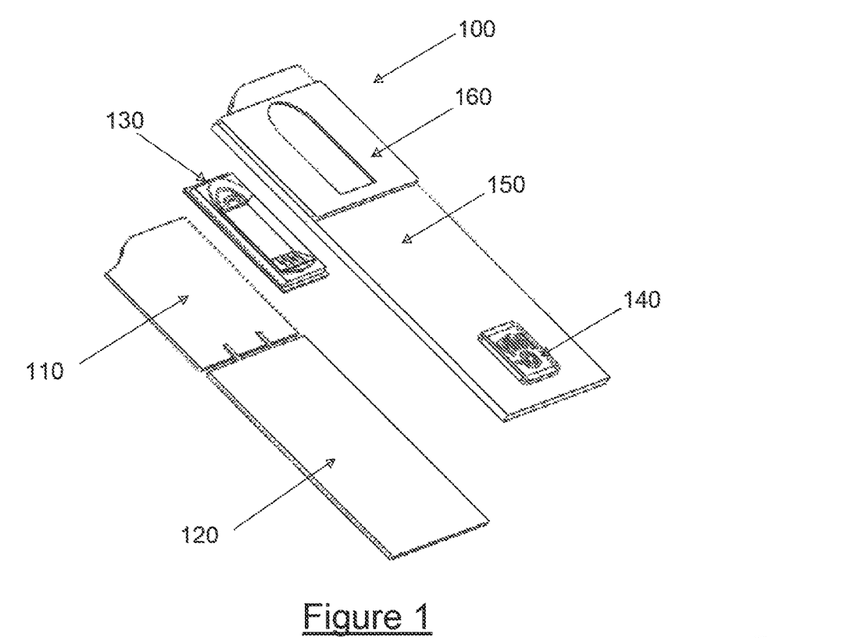
FIG. 1 shows a representation of the different elements making up the biometric data apparatus.

FIG. 1 shows a representation of the different elements making up a biometric data apparatus 100 in accordance with an aspect of the present disclosure. The biometric data apparatus 100 comprises a printed circuit board (PCB) 110 that is connected to a battery 120 and a fingerprint scanner 130 that is connected to the PCB 110. The PCB 110, battery 120 and fingerprint scanner 130 are formed in a body 150 such that the fingerprint scanner 130 is located within a projection 160 on the top surface of the body 150 and is accessible at the top surface of the body 150. The biometric data apparatus 100 also comprises a battery charging and/or data connector 140 that is connected to at least one of the PCB 110 and battery 120 and is located on the top surface of the body 150.

Figure 2:
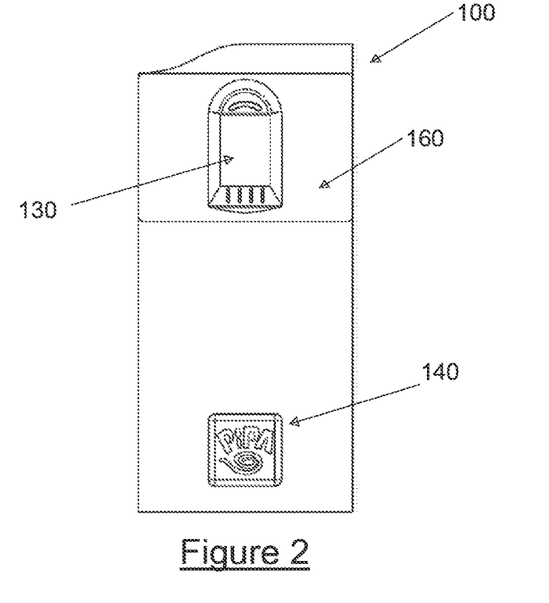
FIG. 2 shows a top-down view of the biometric data apparatus of FIG. 1.

FIG. 2 shows a top-down representation of the biometric data apparatus 100 that shows the fingerprint scanner 130 and charging and/or data connector 140 being accessible on the top surface of the biometric data apparatus 100. Also shown is a cut-away in the upper-left corner (as viewed from the perspective shown in FIG. 2) of the body 150 of the biometric data apparatus 100 that prevents the biometric data apparatus 100 from obstructing an inbuilt camera lens of a mobile electronic device, for example a smartphone, when the biometric data apparatus 100 is positioned on the mobile electronic device (as described later).

Figure 3:
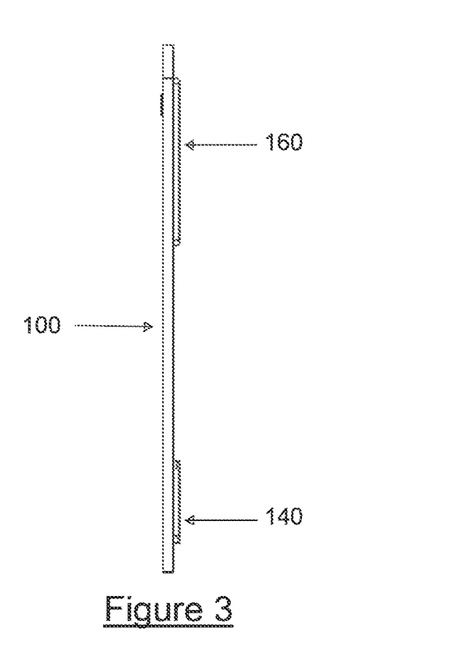
FIG. 3 shows a side-on view of the biometric data apparatus of FIG. 1.

FIG. 3 shows a side-on representation of the biometric data apparatus 100 that shows that the fingerprint scanner 130 lies flush with, or below, the projection 160. In this way, the projection may provide some physical protection for the fingerprint scanner 130.

Figure 4:
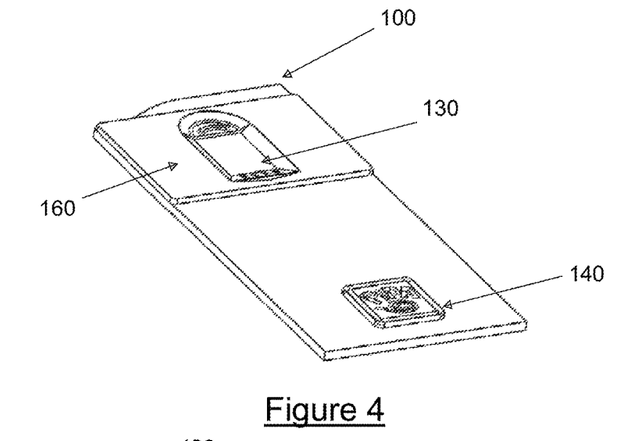
FIG. 4 shows a perspective view of the biometric data apparatus of FIG. 1.

FIG. 4 shows a perspective view of the biometric data apparatus 100 that shows the fingerprint scanner 130 and charging and/or data connector 140 being accessible on the top surface of the biometric data apparatus 100.

Figure 5:
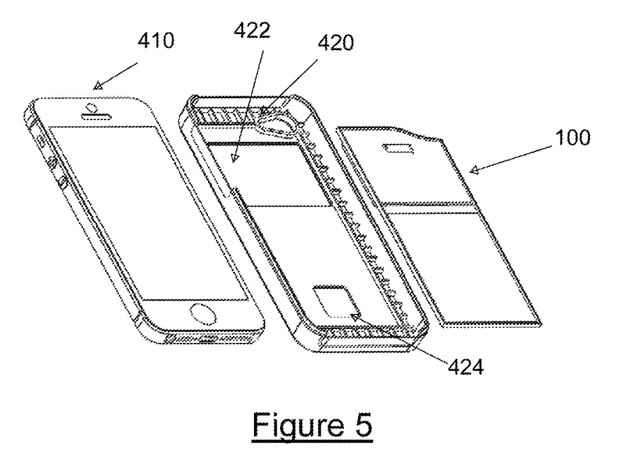
FIG. 5 shows a perspective view of a smartphone, a cover and the biometric data apparatus of FIG. 1.

FIG. 5 shows a perspective view of a smartphone 410, a cover 420 for the smartphone 410 and the biometric data apparatus 100. The smartphone 410 is oriented face-up, such that the screen of the smartphone 410 is visible. The cover 420 is oriented face-down, such that the inside of the cover 420 is visible. The biometric data apparatus 100 is oriented face-down, such that the back of the biometric data apparatus 100 is visible.

Figure 6:
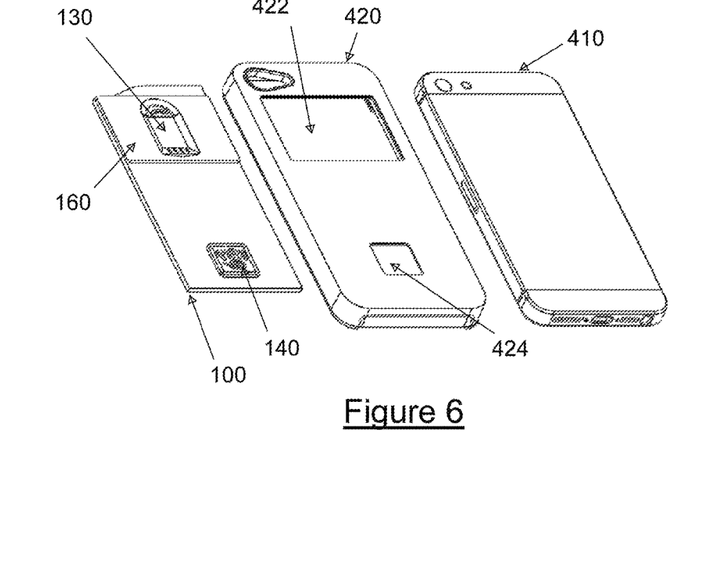
FIG. 6 shows an alternative perspective view of the elements shown in FIG. 5.

FIG. 6 shows a different perspective view of the smartphone 410, the cover 420 and the biometric data apparatus 100. The smartphone 410 is oriented face-down, such that the back surface of the smartphone 410 is visible. The cover 420 is oriented face-up, such that the outside of the cover 420 is visible. The biometric data apparatus 100 is oriented face-up, such that the top surface, on which the fingerprint scanner 130 and charging and/or data connector 140 are accessible, is visible.

The cover 420 is configured to be fitted over the back surface of the smartphone 410 and securely attach to the smartphone 410 around at least some of the sides of the smartphone 410.

The cover comprises a first opening 422 of the same shape and size as the perimeter of projection 160 and a second opening 424 of the same shape and size as the perimeter of the charging and/or data connector 140. The first opening 422 and second opening 424 are located relative to each other to correspond with the relative arrangement of the projection 160 and the charging and/or data connector 140. In this way, the biometric data apparatus 100 may be positioned on the back surface of the smartphone 410, such that the back surface of the smartphone 410 is in contact with the back surface of the biometric data apparatus 100, and the cover 420 be attached to the smartphone 410 over the biometric data apparatus 100 and the back surface of the smartphone 410 with the projection 160 and the charging and/or data connector 140 being located in the first 422 and second 424 openings respectively.

Thus, the biometric data apparatus 100 may be securely held in contact with the smartphone 410 and the cover 420 by being sandwiched between the back surface of the smartphone 410 and the inner surface of the cover 420, and may be prevented from lateral movement by the projection 160 and the charging and/or data connector 140 being located in the first 422 and second 424 openings respectively.

Figure 7:
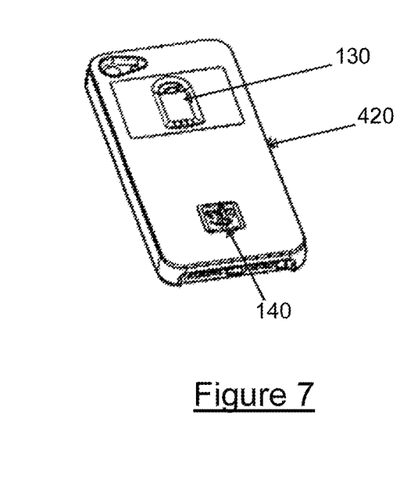
FIG. 7 shows a perspective view of the elements of FIGS. 5 and 6 in an assembled configuration.

FIG. 7 shows a perspective view of the assembled smartphone 410, biometric data apparatus 100 and cover 420 arrangement. The arrangement corresponds to the orientation shown in FIG. 6, wherein the smartphone 410 is face down at the bottom of the assembled arrangement such that the outer surface of the cover 420 is visible, with the fingerprint scanner 130 and charging and/or data connector 140 accessible through the first 422 and second 424 openings in the cover 420. The dimensions of the cover 420 and the projection 160 and/or the charging and/or data connector 140 may be such that the fingerprint scanner 130 and/or the charging and/or data connector 140 are flush with, or below, the outer surface of the cover 420. This may allow the cover 420 to provide some physical protection for the fingerprint scanner 130 and/or the charging and/or data connector 140. As can be seen, in the upper left corner (in the perspective shown in FIG. 7), there is a third opening in the cover 420 such that a camera inbuilt in the smartphone 410 is not obstructed by the cover 420.

Thus, the biometric data apparatus 100 can be securely attached to a smartphone 410 using the cover 420 and may be used to verify an operator's identity before allowing access to functionality on the smartphone 410 (as described later). Consequently, an operator of the smartphone 410 may always have the biometric data apparatus 100 available for use with the smartphone 410 and, thus, may not leave the biometric data apparatus 100 in a different location to that of the smartphone 410. Furthermore, a consumer may add biometric security to their existing smartphone using the biometric data apparatus 100 and cover 420, which may help to make biometric security more feasible and mainstream.

Furthermore, because the biometric data apparatus 100 is releasably coupled to the smartphone 410 (by removing the cover 420 from the smartphone 410), the biometric data apparatus 100 may be decoupled from the smartphone 410 and used with multiple different devices, thus enabling improved biometric security access for many different electronic devices with a single biometric data apparatus 100. Furthermore, as can be seen in FIGS. 5 and 6, the same biometric data apparatus 100 may be securely attached to smartphones 410 of any size and shape using a cover 420 of a size and shape corresponding to the size and shape of the smartphone 410. Each different model of smartphone 410 may have a corresponding cover 420 that has a suitable size and shape for fitting to the smartphone 410, wherein the size, shape and relative locations of the first 422 and second 424 openings are the same in each different cover 420. Thus, a single biometric data apparatus 100 may be attached to smartphones with a variety of different sizes and shapes, such that if a consumer purchases a new smartphone 410, they need only purchase a new cover 410 of a suitable size and shape for the new smartphone in order to attach their existing biometric data apparatus 100 to the smartphone 410. This may represent a considerable financial saving for the consumer compared with having to buy a new biometric data device every time they change their smartphone 410.

The biometric data apparatus 100 is configured for wireless communication with the smartphone 410, for example by Bluetooth, WiFi, Near Field Communications (NFC), infra-red etc. Consequently, there is no need for a wired connection between the biometric data apparatus 100 and the smartphone 410, which might negatively impact on the size and shape of the assembly shown in FIG. 7 and might distort the form factor of the phone with additional bulk. Furthermore, the biometric data device 100 may more easily communicate with different smartphones.

Figure 8:
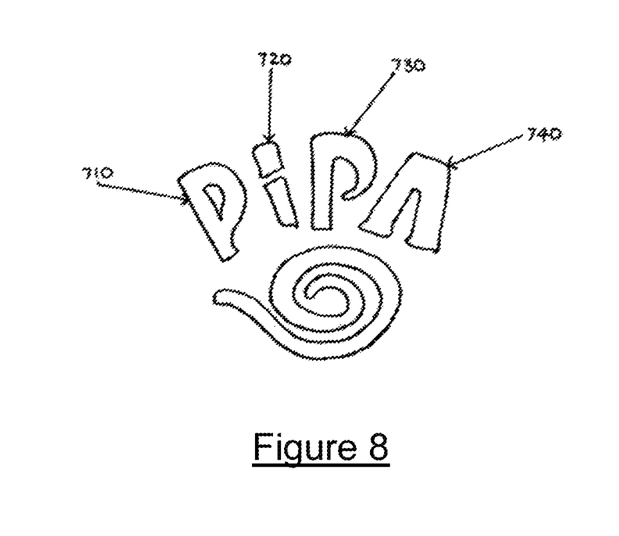
FIG. 8 shows an example design of the charging and/or data connector of the biometric data apparatus of FIG. 1.

FIG. 8 shows the design of the charging and/or data connector 140 in detail. The charging and/or data connector 140 is configured to facilitate battery charging and a USB connection and comprises a voltage supply terminal 710, two data terminals 720 and 730, and a ground terminal 740. In this example, the terminals have the shape of a company logo, although it will be appreciated that they may be of any suitable size or shape.

Figure 9:
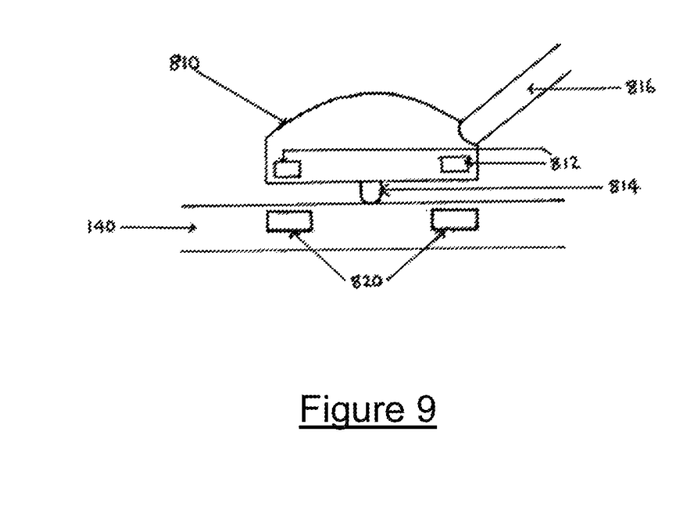
FIG. 9 shows a side view of a charging terminal connected to the charging and/or data connector of FIG. 8.

FIG. 9 shows a side view of charging and/or data connection 140 with a charging terminal 810 attached to it. The charging terminal 810 has an electrical cable 816 and pins 814 arranged to correspond with the terminals 710, 720, 730 and 740 on the charging and/or data connector 140. The charging terminal 810 is held in place on the charging and/or data connector 140 with magnetic elements 812 formed within the charging terminal 810 that correspond with ferrous elements 820 formed within the charging and/or data connector 810.

Figure 10:
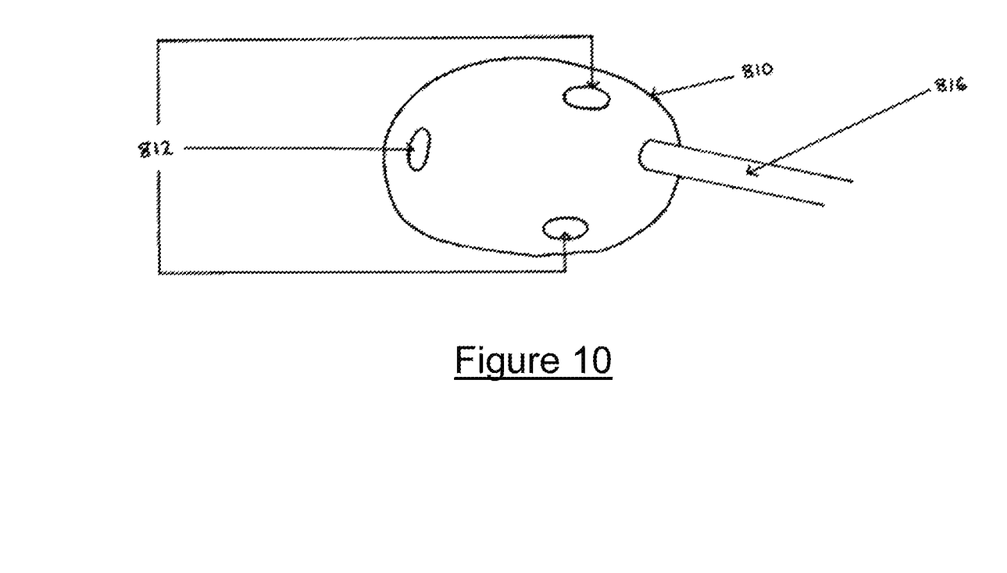
FIG. 10 shows a top-down view of the arrangement of FIG. 9.

FIG. 10 shows top down view of the charging terminal 810, wherein the locations of the magnetic elements 812 within the charging terminal 810 may be more clearly seen.

Figure 11:
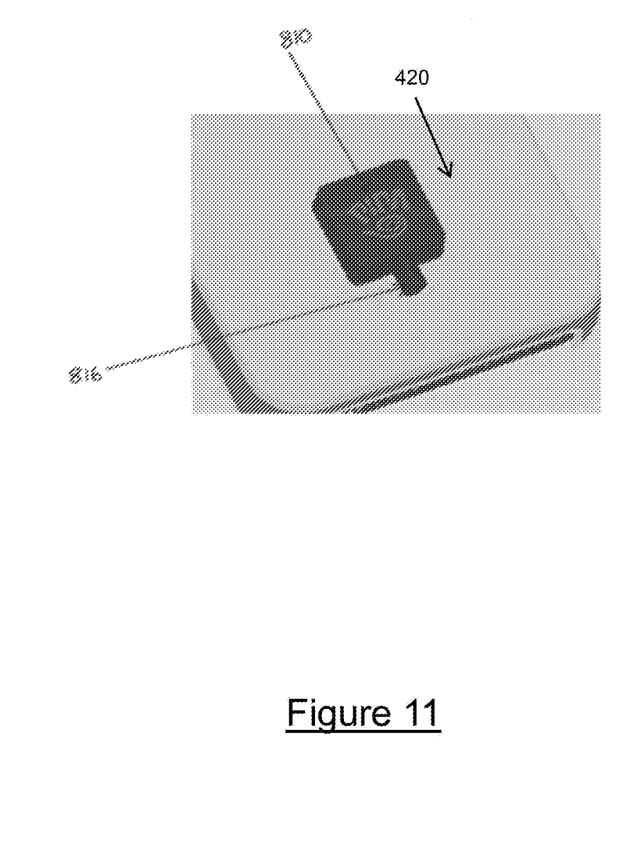
FIG. 11 shows a close-up perspective view of the charging terminal of FIGS. 9 and 10 connected to the assembled configured of FIG. 7.
Figure 12:
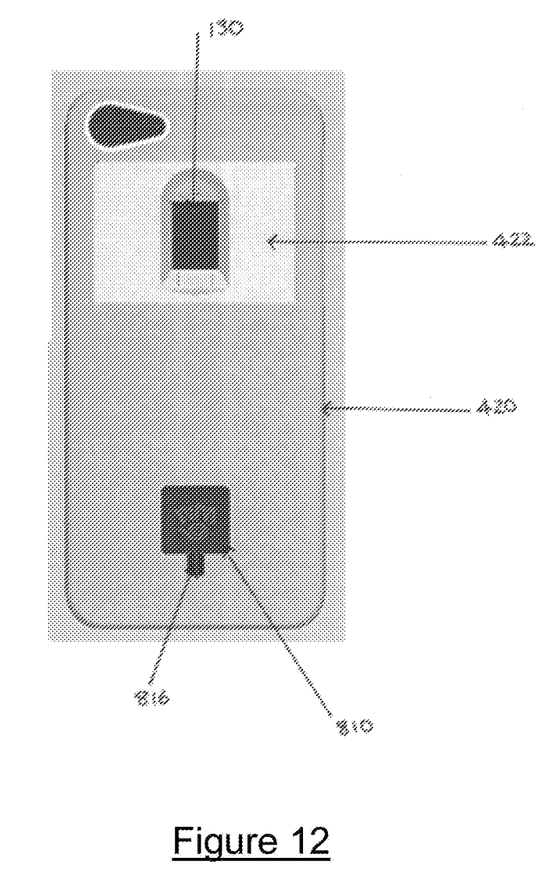
FIG. 12 shows a top-down view of the charging terminal of FIGS. 9 and 10 connected to the assembled configured of FIG. 7.

FIG. 11 shows a close-up perspective view of the charging terminal 810 connected to the charging and/or data connector 140 and FIG. 12 shows a top-down view of the smartphone 410, biometric data apparatus 100 and cover 420 arrangement with the charging terminal 810 connected to the charging and/or data connector 140.

In an aspect of the present disclosure, the biometric data apparatus 100 is utilised to restrict access to a function of the smartphone 410. A function on the smartphone 410 may be configured such that when a user tries to operate the function, a request for an authorisation code is wirelessly transmitted to the biometric data apparatus 100. The user may be prompted by the smartphone 410, for example via the smartphone 410 display screen, to enter a fingerprint into the biometric data apparatus 100 so that their identity may be verified.

Figure 13:
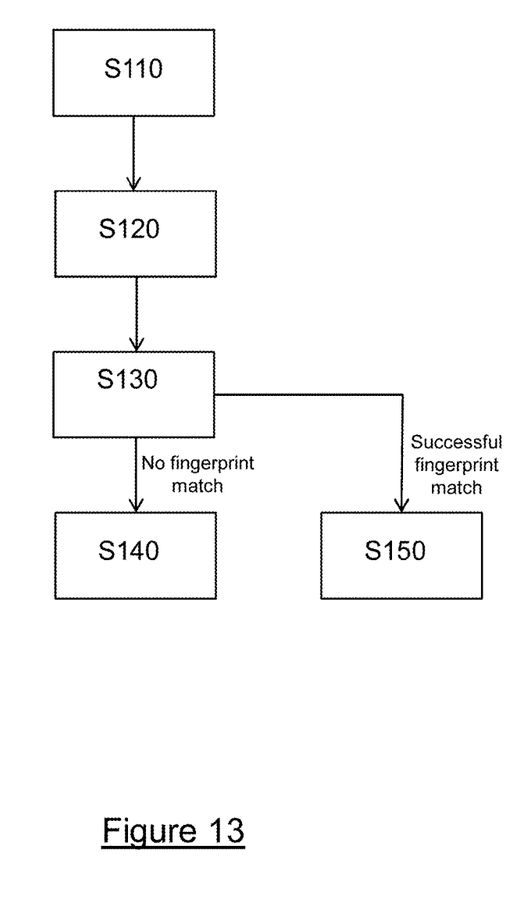
FIG. 13 shows the steps of a method by which the biometric data apparatus of FIG. 1 may be used to access a function of an electronic device.

FIG. 13 shows the steps of a method by which a user of the biometric data apparatus 100 may verify their identity to access a function of the smartphone 410. In step S110, the user places one of their fingers on the fingerprint scanner 130, which will acquire an image of the finger print by any standard means. In step S120, the biometric data apparatus generates a digital template of the fingerprint and in step S130 compares the generated template against a database of stored fingerprint templates held in a memory element on the PCB 110. The database of stored fingerprints may have been created during earlier set-up of the biometric data apparatus 100, wherein the user will scan and save on the biometric data apparatus 100 any fingerprints for which they wish to allow access to one or more functions of an electronic device. For example, they may scan one or more of their own fingerprints and/or one or more fingerprints of other authorised people. New fingerprints may be added to the database and old fingerprints may be deleted from the database by an authorised user at any time.

If the generated template does not match a stored fingerprint template, authentication of the user will fail and in Step S140 the biometric data apparatus 100 wirelessly returns to the smartphone 410 a failure message. The smartphone 410 may then indicate to the user that access to the requested function has been denied.

If the generated template does match a stored fingerprint template, authentication of the user will have been success and in step S150 the biometric data apparatus 100 will wirelessly return an authorisation code to the smartphone 410.

The authorisation code may be an alpha-numeric code that is stored on the biometric data apparatus 100 and may be entered into a dialogue box that was sent to the biometric data apparatus 100 as part of the request for an authorisation code that was earlier transmitted to the biometric data apparatus 100. The transmitted authorisation code may be encrypted, for example using a symmetric or asymmetric encryption techniques with a key stored on the biometric data module.

The smartphone 410 may then match the alpha-numeric code against its database records to confirm its authenticity and if the received alpha-numeric code matches that saved in the smartphone's records, the smartphone will allow access to the requested function. If the received alpha-numeric code does not match that saved in the smartphone's records, the smartphone 410 will not allow access to the requested function and may indicate to the user that access has been denied.

The authorisation code may be a static code, or it may be a randomly generated code. The random code may be generated by an algorithm on the biometric data apparatus 100, wherein the algorithm is in sync with an algorithm on the smartphone 100 which randomly generates a corresponding code held on a database or an application/software on the smartphone 100. In this way, the authorisation code may act as a One-Time-Password (OTP).

In a further aspect of the present disclosure, the biometric data apparatus 100 may authenticate a sequence of fingerprints before it can verify the identity of the user. For example, the user may input two, three, four, five or more fingerprints into the biometric data apparatus 100 either at all at the same time (if the fingerprint scanner 130 is configured to accept this) or sequentially, or in a combination of the two. For example, the user may sequentially enter their index (first) fingerprint, their third fingerprint, their third fingerprint again, their middle (second) fingerprint and then their index (first) fingerprint.

Figure 14:
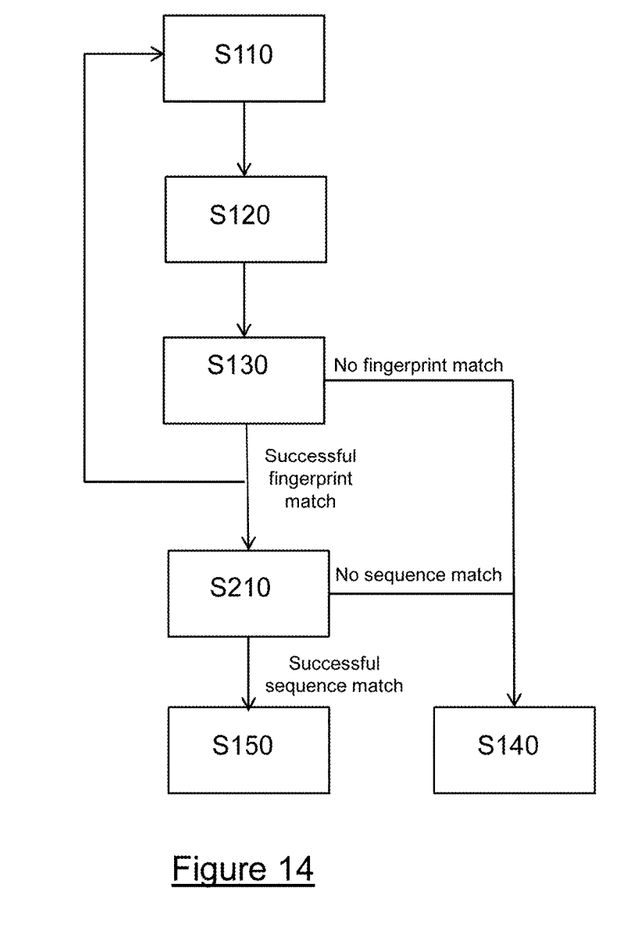
FIG. 14 shows the steps of a further method by which the biometric data apparatus of FIG. 1 may be used to access a function of an electronic device.

FIG. 14 shows the steps of a further method by which a user of the biometric data apparatus 100 may verify their identity to access a function of the smartphone 410 using multiple fingerprints. The user may enter a first fingerprint into the biometric data apparatus 100, and that entered fingerprint be checked by the biometric data apparatus 100 in Steps S110-S130, as described above. If the first entered fingerprint does not match any in the database, the method will proceed to step S140 as described above. If the first entered fingerprint does match a template stored on the database, the method may return to step S110 for entry of a second fingerprint.

This process will be repeated until all of the fingerprints have been entered, whereupon, if each of the fingerprints has matched a template stored on the database, the method will proceed to step S210.

In step S210 the biometric data apparatus 100 checks that the sequence in which the two or more fingerprints were entered matches the sequence stored for that user. The sequence may be saved by the user in a memory element on the PCB 110 during set-up of the biometric data apparatus 100.

If the entered sequence matches the sequence stored on the biometric data apparatus 100 for the user, the biometric data apparatus 100 can authenticate the user's identity and in step S150 wirelessly transmit the requested authorisation code as described above. If the entered sequence does not match the sequence stored on the biometric data apparatus 100 for that user, authentication will fail and the biometric data apparatus 100 may wirelessly transmit in step S140 a failure message to the smartphone 410, as described above.

The sequence stored on the biometric data apparatus 100 may be of any length that the user chooses during set-up of the biometric data apparatus 100, or it may be of a particular length specified by the biometric data apparatus 100, or the smartphone 410, during set-up of the biometric data apparatus 100. In this way, both the input sequence order and length must match that of the stored sequence in order for the user to be authenticated. For example, the sequence may be two, three, five or seven fingerprints long. By allowing for storage of a sequence of any length, security may be improved. For example, if a user moves from one organisation to another, they are likely to use the same sequence. This should not be a problem even if the sequence is compromised since the biometric data apparatus 100 still requires the correct fingerprints to be input. However, if an unauthorised party were also to obtain copies of the user's fingerprints, for example by virtue of a data breach at the user's previous organisation, security at their new organisation will be compromised.

By enabling the stored sequence to be of any length, during set-up of the biometric data apparatus 100, the biometric data apparatus 100 or the smartphone 410 may set a required sequence, wherein the sequence length is randomly generated by the biometric data apparatus 100 or the smartphone 410. Thus, the user may be forced to store a sequence with a length different to that which they might ordinarily choose and/or different to that used with their previous organisation. This may improve the security of the system.

In addition to the stored sequence, there may also be an access recovery sequence saved on the memory element of the PCB 110. This may be used by the user to gain access to the function of the smartphone 410 when they have forgotten their stored sequence.

For example, the user may contact a help-desk and notify them that they have forgotten their stored sequence. The help-desk may check the identity of the user in any way they deem fit, for example using security questions and/or passwords, and then communicate to the user, for example with via a voice call, text message, email etc, the access recovery sequence. The user may then enter their fingerprints in the access recovery sequence and the biometric data module 100 can verify the generated fingerprint templates, match the input sequence to the stored access recovery sequence and allow access to the function on the smartphone 410. In this way, access recovery may be achieved quickly and neither the user's stored sequence, nor any of their stored fingerprint templates are compromised to any party, including the help-desk. This may help to maintain the security of the biometric data apparatus 100. Furthermore, even if the access recovery sequence became known to an unauthorised party, provided they do not have access to the user's finger prints, security of the biometric data apparatus 100 is still maintained.

The access recovery sequence may be made a temporary sequence in that after it has been used by the user once, it becomes invalid such that it may not be used again. In this way, the access recovery sequence would be a one-time-sequence or one-time-password, such that even if the access recovery sequence were compromised, it would not allow unlimited authentication by the biometric data device 100.

The access recovery sequence may be the same on every different biometric data apparatus 100. Alternatively, it may be generated randomly by the biometric data device 100 or by some other electronic device during manufacture or set-up of the biometric data apparatus 100. Alternatively, the access recovery sequence may be generated randomly by the biometric data apparatus 100 at any time during its life, in which case it may regularly change over time. The randomly generated access recovery sequences may be securely communicated by the biometric data apparatus 100 to the helpdesk by any suitable communication means, for example via a communications device such as a WiFi modem on the biometric data apparatus 100, or by piggy backing off a communications connection on the smartphone 410, so that the help desk is aware of the current access recovery sequence.

Alternatively, the access recovery sequence may be generated elsewhere, for example the help-desk may randomly generate the access recovery sequence either periodically or in response to a request from the user, and communicate it to the biometric data apparatus 100 by any suitable means so that it may be stored in the memory element of the biometric data apparatus 100.

If the access recovery sequence is a one-time password, after the one-time password has expired, a new access recovery sequence may be generated by the biometric data apparatus 100 or by some other device (for example a terminal at the help-desk) and may be shared between the biometric data apparatus 100 and the help-desk as described above.

The function of the smartphone 410 to which access may be granted or denied by the biometric data apparatus 100 may be unlocking of the smartphone 410, such that the smartphone 410 may only be unlocked when the user's identity has been authenticated by the biometric data device 100. Additionally, or alternatively, the function of the smartphone 410 may be locking of the smartphone 410, such that only an authorised user may lock the smartphone 410.

Additionally, or alternatively, the function of the smartphone 410 to which access may be granted or denied by the biometric data apparatus 100 may be a 'password bank' application or software on the smartphone 410. For example, the user may try to access a secure webpage (such as an email service, online shopping etc) that requires some identification credentials of the user (for example, at least one of a username, password, PIN etc). If the biometric data apparatus 100 authenticates the user and transmits the authentication code to the password bank application or software, the password bank will then enter the necessary identification credentials (which the user will have earlier saved in the password bank) into the webpage in order to log the user into the webpage.

Additionally, or alternatively, the function of the smartphone 410 to which access may be granted or denied by the biometric data apparatus 100 may be a financial transaction service operating on the smartphone 410. For example, upon receipt of the authentication code from the biometric data apparatus 100, credit card information and/or other financial credentials may be securely stored on the smartphone 100 and smartphone 100 may enter the credit card information and/or other financial information into a web-form or application requiring the information.

Additionally, or alternatively, the function of the smartphone 410 to which access may be granted or denied by the biometric data apparatus 100 may be a financial transaction service operating in the cloud. For example, upon receipt of the authentication code from the biometric data apparatus 100, credit card information and/or other financial credentials may be securely stored in the cloud and the smartphone 100 may retrieve the credit card information and/or other financial information from the cloud and enter it into a web-form or application requiring the information.

Additionally, or alternatively, the function of the smartphone 410 to which access may be granted or denied by the biometric data apparatus 100 may be a financial transaction carried out via an NFC device on the smartphone 100. For example, upon receipt of the authentication code from the biometric data apparatus 100, an NFC transaction application/software may carry out a financial transaction via NFC. It may also enter any necessary financial credentials into an NFC application/software having obtained the credentials from a database on the smartphone 100, or from the cloud, or from any other location.

Additionally, or alternatively, the function of the smartphone 410 to which access may be granted or denied by the biometric data apparatus 100 may be a financial transaction carried out using a barcode. For example, upon receipt of the authentication code, a financial transaction application/software may generate a unique barcode/QR code that may be displayed on the smartphone 410 to facilitate a financial transaction. It may also enter any necessary financial credentials into the financial transaction application/software having obtained the credentials from a database on the smartphone 100, or from the cloud, or from any other location.

Additionally, or alternatively, the function of the smartphone 410 to which access may be granted or denied by the biometric data apparatus 100 may be the display of a means of identification, such as a drivers license, a passport, an ID card etc. Upon receipt of the authentication code, the smartphone 410 may display the means of identification and/or communicate the means of identification with another device, for example by wireless communication, and/or submit the means of identification via a webportal etc. The means of identification may be held securely in a database or application/software on the smartphone 410, or it may be stored in the cloud or anywhere else accessible to the smartphone 410.

A number of alternatives to the aspects described above may be readily appreciated.

For example, the smartphone 410 may be any electronic device with which the biometric data device 100 may communicate, for example a tablet computer, a laptop etc. Likewise, the cover 420 may be configured to fit over any suitable surface of any suitable electronic device, for example over the back surface of a tablet computer, or over the back surface of a laptop screen etc.

The biometric data device 100 may be configured to receive one or more of any form of biometric data from a user, for example, in addition or as an alternative to the fingerprint scanner 130, it may have at least one of an iris scanner, a microphone for voice recognition authentication, a camera for face recognition etc.

In the drawings and above description show the biometric data apparatus 100 and cover 420 being configured to releasably couple the biometric data device 100 to the electronic device 410 by holding the biometric data apparatus 100 between the electronic device 100 and the cover 420 when the cover 420 is fitted to the electronic apparatus 100. Whilst it is shown in the Figures that the biometric data apparatus is in direct contact or engagement with the electronic device 410 and the cover 420. However, the biometric data apparatus 100 and cover 420 it may be configured to releasably engage with each other in any way so that the biometric data device 100 can be releasably coupled to the electronic device 420 when the cover is fitted to the electronic device 420. Coupling of the biometric data apparatus 100 and the electronic device 410 does not necessarily have to involve direct physical contact between the biometric data apparatus 100 and the electronic device 410, or direct contact between the biometric data apparatus 100 and the cover 420. Instead, one or more other elements may separate the biometric data apparatus 100 and the electronic device 410 and/or separate the biometric data apparatus 100 and the cover 420 when the biometric data apparatus 100 is coupled to the electronic device 410.

For example, in the arrangements shown in the Figures, one or more additional elements may be located between the electronic device 410 and the biometric data apparatus 100 and/or between the biometric data apparatus 100 and the cover 420, wherein the biometric data apparatus 100 will still be sandwiched and held between the electronic device 410 and the cover 420 when the cover 420 is fitted to the electronic device. Alternatively, a pocket may be formed on the outer surface of the cover 420 such that the biometric data apparatus 100 may be reversibly inserted into the pocket in order to releasably engage the biometric data apparatus 100 with the cover 420. Alternatively, for example, protrusions may be formed on the surface of the cover 420, between which the biometric data apparatus 100 may be reversibly slid in order to releasably engage the biometric data apparatus 100 with the cover 420. Alternatively, for example, the cover 420 may comprise an opening into which the biometric data apparatus 100 may be placed, wherein the opening and biometric data apparatus form a reversible mechanical engagement (for example, a snap fit) in order to releasably engage the biometric data apparatus 100 with the cover 420. Alternatively, for example, a reversible mechanical connection means may be formed on the biometric data apparatus 100 and corresponding reversible mechanical connection means formed on the cover 420 (for example, Velcro, poppers etc) such that the biometric data apparatus 100 may releasably engage the cover 420.

The biometric data apparatus 100 may not be provided with a charging and/or data connector 140 at all. Charging of the battery may take place via wireless charging techniques and all data transmissions to and from the biometric data apparatus 100 may be wireless. When a charging and/or data connector 140 is provided, it may comprise any number of terminals in any configuration and be formed in any shape or size. Furthermore, it may be provided on any surface of the biometric data apparatus 100 and need not be accessible when electronic device 410, biometric data device 100 and cover 420 are assembled together (although it may be preferable for the charging and/or data connector 140 to be accessible when the arrangement is assembled for ease of charging of and/or data connection to the biometric data apparatus 100).

In the above described aspects, the biometric data apparatus 100 has a protrusion 160 from the surface of the body of the apparatus and the charging and/or data connector 140 also protrudes from the surface of the body of the apparatus. However, one or both of these features may not protrude from the surface of the body of the apparatus at all, but instead be level with, or below, the surface of the body of the apparatus. In this case, when the electronic device 410, biometric data apparatus 100 and cover 420 are assembled together, the fingerprint scanner 130 and/or the charging and/or data connector 140 would sit below the surface of the cover 420. The biometric data apparatus 100 may be held securely in place relative to the cover 420 by any other suitable means. In one example, one or more other protrusions from, and/or recesses in, the surface of the body of the apparatus may be provided, wherein those protrusions and/or recesses are configured to engage with corresponding, complementary elements in the cover 420 when the cover 420 is fitted over the biometric data apparatus 100 and the electronic device 410. In another example, additionally, or alternatively, the biometric data apparatus may be provided with one or more magnetic or ferrous elements that are configured to correspond with complementary ferrous or magnetic elements in the cover 420, such that when the cover 420 is fitted over the biometric data apparatus 100 and the electronic device 410, it is held in place relative to the cover 420 by virtue of magnetic attraction.

Furthermore, whilst the drawings show an essentially planar back surface of the biometric data apparatus 100, the back surface may be of any shape suitable to engage with a surface of the electronic device 210 such that it may be held firmly between the electronic device 210 and the cover 220. For example, it may be curved such that only a part of the back surface of the biometric data apparatus 100 is in contact with the surface of the electronic device 410. Likewise, the top surface of the biometric data apparatus 100 and the surface of the cover 420 may not be essentially planar, but may be any shape suitable for the top surface of the biometric data device 100 to engage with the surface of the cover 420. Furthermore, only part of the top surface of the biometric data apparatus 100 may engage with the surface of the cover 420.

Furthermore, the biometric data apparatus 100 may have any suitable form factor.

Furthermore, the charging and/or data connector 140 and the charging terminal 810 may be configured to be held in engagement by any suitable means, for example by any form of mechanical connection.

Whilst in the above described aspects, operation of the biometric data apparatus 100 is generally described when it is in contact with the electronic device 410 in the assembled arrangement with the electronic device 410, biometric data apparatus 100 and cover 420, it will be readily appreciated that the biometric data apparatus 100 may be operated at any distance from the electronic device 410, provided it can form a data connection with the electronic device 410. Furthermore, the biometric data apparatus 100 may operate with any number of different electronic devices. For example, the biometric data apparatus 100 may be in contact with a smartphone in the assembled arrangement with the smartphone, the biometric data apparatus 100 and cover 420 and may provide biometric data security functionality for the smartphone and also independently any other suitable electronic devices (for example a further smartphone, a laptop computer, a desktop computer etc) that are within communication range of the biometric data apparatus 100.

Rather than verifying the user's identity itself, the biometric data apparatus 100 may alternatively transmit one or more scanned images of the input fingerprint(s) and/or one or more generated templates of the input fingerprint(s) to the electronic device 410 for authentication. The electronic device 410 may carry out authentication itself by using fingerprint templates stored on the electronic device 410 (for example in a database and/or software) and sequences stored on the electronic device (where necessary) or by using fingerprint templates stored elsewhere, for example on the cloud or any other device with which the electronic device 410 is in communication (for example a remote database). Alternatively, the electronic device 410 may forward the received generated templates and/or images on to a third party for authentication, for example to another device with which the electronic device 410 is in communication or to a web-based service.

Communication between the electronic device 410 and the biometric data apparatus 100 may take place by any suitable means, for example via a wireless connection (such as Bluetooth, WiFi, infra-red, NFC etc) or a wired connection, for example USB etc. The biometric data apparatus 100 may therefore comprise any suitable elements for wireless communications to and from the biometric data apparatus 100, for example a Bluetooth transceiver, a WiFi modem, an infra-red transceiver, an NFC transceiver etc.

Whilst in the above described aspects the electronic device 410 first transmits a request for authentication to the biometric data apparatus 100, the biometric data apparatus may alternatively carry out authentication without any prompting. For example, the user may simply input their fingerprint(s) and the biometric data apparatus 100 may then transmit any necessary data (i.e. an authorisation code, generated fingerprint templates etc) to the electronic device 410. In one example, the user may wish to unlock the electronic device 410 and the biometric data device 100 may authenticate the user's identity and transmit an instruction to unlock the electronic device 410 and/or an authorisation code to the electronic device 410 in order to unlock the electronic device 410. Where the biometric data device 100 does not itself perform authentication, it may instead transmit a generated template(s) and/or image(s) of the input finger print(s) to the electronic device 410 for authentication and subsequent unlocking of the electronic device 410.

Furthermore, rather than transmitting an authorisation code to the smartphone 410, the biometric data module 100 may transmit some other data that is requested by the smartphone and that is stored on the biometric data module 100. For example, the transmitted data may include at least one of financial transaction information, means of identification, a password(s) etc. Optionally, in addition to transferring the at least one requested information item, the biometric data module 100 may also transmit the authorisation code, for example so that the smartphone 100 may authenticate the transmitted data.

Whilst some particular functions of the electronic device 410 are described above, it will be appreciated that access to any function of the electronic device for which the user wishes to utilise biometric control may be controlled using the biometric data apparatus 100 of the present disclosure.

Whilst in the above described methods for authenticating the identity of a user are described in respect of a separate biometric data device 100 and electronic device 410, it will be appreciated that the methods for authenticating the identity of a user may be used by an electronic device with an incorporated biometric data input element. For example, the process of determining the user's identity using two or more input biometric data items and comparing the input sequence to an access recovery sequence may be utilised by an electronic device with an incorporated biometric data input element in order to control access to a function of the electronic device. In the method steps shown in FIG. 14, each input biometric data item is compared with the stored biometric templates immediately after the biometric data item is input. However, the method may alternatively receive some or all of the input biometric data items before comparing the input biometric data items with the stored biometric templates. The method may then proceed to Step S140 if at least one of the input biometric data items fails to match a stored biometric template and/or the input sequence does not match a stored sequence (or an access recovery sequence). For example, authorisation may have failed only because the first entered biometric data item failed to match a stored template, but the user will not know which, if any, of the input biometric data items failed, or if it was the input sequence that failed. In this way, the user will not know which part(s) the authorisation process they have failed, which makes it more difficult for unauthorised users to overcome the biometric security.

In a further alternative aspect of the present disclosure, the functionality of the biometric data apparatus may be incorporated into a cover for an electronic device, such as a smartphone or tablet, wherein the cover is configured for wireless communication with the electronic device. By avoiding the need for wired communication, the form factor of the cover may be the same as, or similar to, the form factor of existing covers for electronic devices and thus enable biometric security for existing electronic devices without an increase in the size of the device and cover.

The invention claimed is:

1. A biometric data apparatus for communication with an electronic device, wherein the biometric data apparatus comprises:
   a body;
   a biometric data input element formed on the body; and
   a memory element configured to store at least one biometric template;
   wherein at least part of the body is configured such that the biometric data apparatus is reversibly mechanically connectable to the electronic device when a cover for the electronic device is fitted to the electronic device, and wherein the body is configured to be held between the electronic device and the cover when the cover is fitted to the electronic device,
   and wherein the biometric data input element is configured to correspond with a biometric input opening in the cover such that when the biometric data apparatus is held between the electronic device and the cover when the cover is fitted to the electronic device, a location of the biometric data input element corresponds to the biometric input opening in the cover and the biometric data input element is thus accessible through the biometric input opening in the cover;
   and wherein the biometric data apparatus is configured to:
      generate the at least one biometric template for a biometric data item input via the biometric data input element;
      transmit the at least one biometric template to the electronic device;
      determine, based on a comparison of a biometric data item input via the biometric data input element to the at least one biometric template, if access to a function of the electronic device is to be allowed; and
      if access to the function of the electronic device is to be allowed, transmit data to the electronic device to enable access to the function of the electronic device.

2. The biometric data apparatus of claim 1, wherein the body comprises:
   a first surface wherein at least part of the first surface is suitable for engagement with a surface of the electronic device such that the biometric data apparatus is held between the surface of the electronic device and the cover when the cover is fitted to the electronic device.

3. The biometric data apparatus of claim 1, wherein the body comprises:
   a second surface, wherein at least part of the second surface is suitable for engagement with a surface of the cover for the electronic device such that the biometric data apparatus is held between the electronic device and the surface of the cover when the cover is fitted to the electronic device.

4. The biometric data apparatus of claim 1 wherein the biometric data apparatus further comprises:
   a battery; and
   a battery charging connector, wherein
   the battery charging connector is configured to correspond with a battery charging opening in the cover such that when the biometric data apparatus is held between the electronic device and the cover when the cover is fitted to the electronic device, a location of the biometric data input element corresponds to the biometric input opening in the cover.

5. The biometric data apparatus of claim 3, further comprising:
   a protrusion on the second surface of the biometric data apparatus, wherein the protrusion is configured to correspond with a receiving element in the cover such that when the biometric data apparatus is held between the electronic device and the surface of the cover when the cover is fitted to the electronic device, the protrusion at least partially enters the receiving element such that the biometric data apparatus is held in a fixed position relative to the cover.

6. The biometric data apparatus of claim 5, wherein the protrusion is formed adjacent to the perimeter of the biometric input element and is configured to correspond with a biometric input opening in the cover.

7. The biometric data apparatus of claim 1, wherein the memory element is further configured to store an access recovery sequence, and wherein the biometric data apparatus is further configured to:
   determine if access to a function of the electronic device is to be allowed based upon:
      a comparison of at least two biometric data items input via the biometric data input element to the at least one biometric template; and
      a comparison of a sequence in which the two biometric data items were input via the biometric data input element against the access recovery sequence.

8. The biometric data apparatus of claim 1, wherein the function of the electronic device is unlocking of the electronic device, such that if access to the function of the electronic device is to be allowed, the electronic device will unlock.

9. A cover for an electronic device, the cover comprising:
   a biometric data apparatus coupling element, wherein at least part of the biometric data apparatus coupling element is configured releasably to couple the biometric data apparatus to the electronic device when the cover is fitted to the electronic device, and wherein     the biometric data apparatus coupling element comprises a surface configured such that the biometric data apparatus is held between a surface of the cover and the electronic device when the cover is fitted to the electronic device; and     a biometric input opening in the surface of the cover, configured such that when the cover is fitted to the electronic device and the biometric data apparatus is held between the surface of the cover and the electronic device, the biometric input opening corresponds with a biometric data input element on a biometric data apparatus and the biometric data input element is thus accessible through the biometric input opening in the cover.

10. The cover of claim 9, further comprising:

a battery charging opening in the surface of the cover, wherein the battery charging opening is configured such that when the cover is fitted to the electronic device and the biometric data apparatus is held between the surface of the cover and the electronic device, the battery charging opening corresponds with a battery charging connection on the biometric data apparatus.

11. The cover of claim 9, wherein the biometric data apparatus coupling element further comprises:

a receiving element on the surface of the cover wherein the receiving element is configured to correspond with a protrusion on the biometric data apparatus such that when the cover is fitted to the electronic device and the biometric data apparatus is held between the surface of the cover and the electronic device, the protrusion at least partially enters the receiving element such that the biometric data apparatus is held in a fixed position relative to the cover.

12. The cover of claim 11, wherein the receiving element is the biometric input opening.

13. A kit of parts comprising:
a biometric data apparatus comprising:
    a body; and
    a biometric data input element formed on the body; and
a cover comprising:
    a biometric data apparatus coupling element;
wherein at least part of the biometric data apparatus coupling element is configured releasably to couple the biometric data apparatus to the electronic device when the cover is fitted to the electronic device;
wherein the biometric data apparatus coupling element comprises a surface configured such that the biometric data apparatus is held between a surface of the cover and the electronic device when the cover is fitted to the electronic device;
wherein a biometric input opening in the surface of the cover, configured such that when the cover is fitted to the electronic device and the biometric data apparatus is held between the surface of the cover and the electronic device, the biometric input opening corresponds with a biometric data input element on a biometric data apparatus;
wherein at least part of the body is configured such that the biometric data apparatus is reversibly mechanically connectable to the electronic device when a cover for the electronic device is fitted to the electronic device;
wherein the body is configured to be held between the electronic device and the cover when the cover is fitted to the electronic device; and
wherein the biometric data input element is configured to correspond with a biometric input opening in the cover such that when the biometric data apparatus is held between the electronic device and the cover when the cover is fitted to the electronic device, a location of the biometric data input element corresponds to the biometric input opening in the cover and the biometric data input element is thus accessible through the biometric input opening in the cover.

\* \* \* \* \*